United States Patent
Hendry

(10) Patent No.: US 12,464,131 B2
(45) Date of Patent: Nov. 4, 2025

(54) IMAGE ENCODING/DECODING METHOD AND APPARATUS FOR DETERMINING WHETHER OR NOT TO REFER TO PARAMETER SET ON BASIS OF OUTPUT LAYER SET, AND METHOD FOR TRANSMITTING BITSTREAM

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 17/915,799

(22) PCT Filed: Apr. 1, 2021

(86) PCT No.: PCT/KR2021/004063
§ 371 (c)(1),
(2) Date: Mar. 30, 2023

(87) PCT Pub. No.: WO2021/201628
PCT Pub. Date: Oct. 7, 2021

(65) Prior Publication Data
US 2023/0224469 A1 Jul. 13, 2023

Related U.S. Application Data

(60) Provisional application No. 63/005,464, filed on Apr. 6, 2020, provisional application No. 63/003,813, filed on Apr. 1, 2020.

(51) Int. Cl.
H04N 19/136 (2014.01)
H04N 19/105 (2014.01)
H04N 19/169 (2014.01)

(52) U.S. Cl.
CPC ......... *H04N 19/136* (2014.11); *H04N 19/105* (2014.11); *H04N 19/188* (2014.11)

(58) Field of Classification Search
CPC ... H04N 19/136; H04N 19/105; H04N 19/188
See application file for complete search history.

(56) References Cited

U.S. PATENT DOCUMENTS

2015/0373361 A1* 12/2015 Wang ............... H04N 19/70
 375/240.16
2017/0019673 A1* 1/2017 Tsukuba ............. H04N 19/30
(Continued)

FOREIGN PATENT DOCUMENTS

KR 10-2017-0020793 A 2/2017
KR 10-2017-0023844 A 3/2017

OTHER PUBLICATIONS

JVET-Q0786v2, Joint Video Experts Team (JVET) of ITU-T SG 16 WP 3 and ISO/IEC JTC 1/SC 29/WG 11, Document: JVET-Q2001-v2, 17th Meeting: Brussels, BE, Jan. 7-17, 2020, Title: AHG9: On PTL and HRD Parameters Signalling in VPS; Status: Input document to JVET; Purpose: Proposal, Author(s): Sachin Deshpande, (6 pages).

(Continued)

*Primary Examiner* — Rowina J Cattungal
(74) *Attorney, Agent, or Firm* — Bryan Cave Leighton Paisner LLP

(57) ABSTRACT

An image encoding/decoding method and apparatus is provided. An image decoding method performed by an image decoding apparatus comprises determining reference availability of the parameter set for decoding the image coding data and decoding the image coding data based on the reference availability.

8 Claims, 16 Drawing Sheets

(56) References Cited

U.S. PATENT DOCUMENTS

| | | |
|---|---|---|
| 2019/0052910 A1 | 2/2019 | Deshpande |
| 2023/0054567 A1* | 2/2023 | Sánchez De La Fuente ............... H04N 19/33 |
| 2023/0082783 A1* | 3/2023 | Wang .................. H04N 19/188 375/240.02 |
| 2023/0085937 A1* | 3/2023 | Deshpande ............ H04N 19/70 |

OTHER PUBLICATIONS

JVET-Q2001, Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020, Title: Versatile Video Coding (Draft 8); Status: Output document approved by JVET; Purpose: Draft text of video coding specification, Author(s): Benjamin Bross et al., (515 pages).

* cited by examiner

FIG. 11

| video_parameter_set_rbsp( ) { | Descriptor |
|---|---|
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |

FIG. 12

```
for( i = 0; i <= vps_max_layers_minus1; i++ ) {
    for( j = 0; j <= vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ] && dependencyFlag[ k ][ j ] )
                dependencyFlag[ i ][ j ] = 1
    }
    LayerUsedAsRefLayerFlag[ i ] = 0
}
for( i = 0; i <= vps_max_layers_minus1; i++ ) {
    for( j = 0, d = 0, r = 0; j <= vps_max_layers_minus1; j++ ) {
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

FIG. 13

| seq_parameter_set_rbsp( ) { | Descriptor |
|---|---|
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
|    profile_tier_level( 1, sps_max_sublayers_minus1 ) | |
| gdr_enabled_flag | u(1) |
| chroma_format_idc | u(2) |
| if( chroma_format_idc == 3 ) | |
|    separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |

FIG. 14

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |

FIG. 15

| adaptation_parameter_set_rbsp( ) { | Descriptor |
|---|---|
|    adaptation_parameter_set_id | u(5) |
|    aps_params_type | u(3) |
|    if( aps_params_type == ALF_APS ) | |
|       alf_data( ) | |
|    else if( aps_params_type == LMCS_APS ) | |
|       lmcs_data( ) | |
|    else if( aps_params_type == SCALING_APS ) | |
|       scaling_list_data( ) | |
|    aps_extension_flag | u(1) |
|    if( aps_extension_flag ) | |
|       while( more_rbsp_data( ) ) | |
|          aps_extension_data_flag | u(1) |
|    rbsp_trailing_bits( ) | |
| } | |

FIG. 16

```
for( i = 0; i <= vps_max_layers_minus1; i++ ) {
    for( j = 0; j <= vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ] && dependencyFlag[ k ][ j ] )
                dependencyFlag[ i ][ j ] = 1
    }
    LayerUsedAsRefLayerFlag[ i ] = 0
}
for( i = 0; i <= vps_max_layers_minus1; i++ ) {
    for( j = 0, d = 0, r = 0; j <= vps_max_layers_minus1; j++ ) {
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

IMAGE ENCODING/DECODING METHOD AND APPARATUS FOR DETERMINING WHETHER OR NOT TO REFER TO PARAMETER SET ON BASIS OF OUTPUT LAYER SET, AND METHOD FOR TRANSMITTING BITSTREAM

CROSS-REFERENCE TO RELATED APPLICATIONS

This application is the National Stage filing under 35 U.S.C. of International Application No. PCT/KR2021/004063, filed Apr. 1, 2021, which claims the benefit of earlier filing date and right of priority to U.S. Provisional Application No. 63/003,813, filed Apr. 1, 2020, U.S. Provisional Application No. 63/005,464, filed Apr. 6, 2020, the contents of which are all hereby incorporated by reference herein in their entirety.

TECHNICAL FIELD

The present disclosure relates to an image encoding/decoding method and apparatus, and, more particularly, to an image encoding and decoding method and apparatus for determining whether to reference a parameter set, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by determining whether to refer to a parameter set.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure. For example, a bitstream for enabling the image decoding apparatus according to the present disclosure to perform the image decoding method according to the present disclosure may be stored in the recording medium.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining a parameter set and image coding data from a bitstream, determining reference availability of the parameter set for decoding the image coding data, and decoding the image coding data based on the reference availability. The reference availability may be determined based on whether an output layer set including a layer corresponding to the image coding data among output layer sets includes a predetermined layer.

In addition, an image decoding apparatus according to an aspect of the present disclosure may comprise a memory and at least one processor. The at least one processor may be configured to obtain a parameter set and image coding data from a bitstream, to determine reference availability of the parameter set for decoding the image coding data, and to decode the image coding data based on the reference availability. The reference availability may be determined based on whether an output layer set including a layer corresponding to the image coding data among output layer sets includes a predetermined layer.

In addition, an image encoding method performed by an image encoding apparatus according to an aspect of the present disclosure may comprise encoding an image to generate image coding data for a portion of the image and a parameter set for the coding data and generating a bitstream including the image coding data and the parameter set. The parameter set may be generated based on reference availability of the parameter set for decoding the image coding data. The reference availability may be determined based on whether an output layer set including a layer corresponding to the image coding data among output layer sets includes a predetermined layer.

Also, a transmission method according to another aspect of the present disclosure may transmit a bitstream generated by an image encoding apparatus or method according to the present disclosure.

Also, a computer-readable recording medium according to another aspect of the present disclosure may store a bitstream generated by an image encoding method or apparatus according to the present disclosure.

Also, a computer-readable recording medium according to another aspect of the present disclosure may store a bitstream for enabling a decoding apparatus to perform the image decoding method according to the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by determining whether to refer to a parameter set.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 11 to 12 are views illustrating a VPS NAL unit according to an embodiment.

FIG. 13 is a view illustrating an SPS NAL unit according to an embodiment.

FIG. 14 is a view illustrating a PPS NAL unit according to an embodiment.

FIG. 15 is a view illustrating an APS NAL unit according to an embodiment.

FIG. 16 is a view illustrating another embodiment of the pseudocode of FIG. 12.

MODE FOR INVENTION

Figure 1:
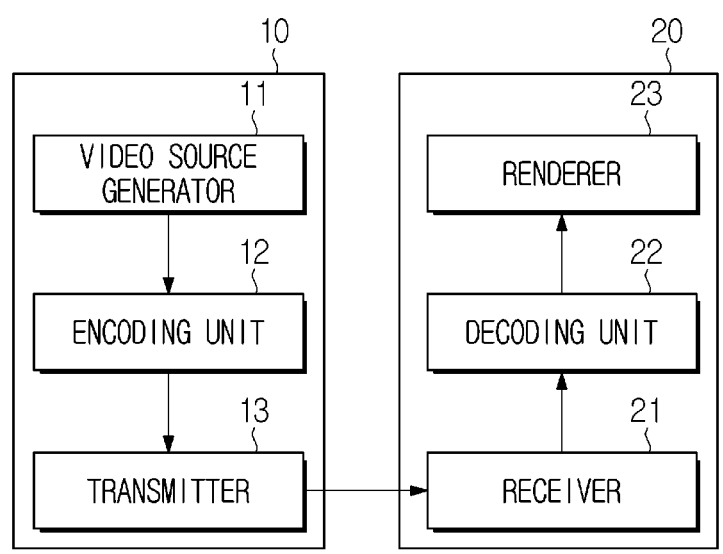
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Method/embodiments disclosed in the present disclosure are applicable to methods disclosed in the versatile video coding (VVC) standard. In addition, method/embodiments disclosed in the present disclosure are applicable to methods disclosed in the essential video coding (EVC) standard, the AOMedia Video 1 (AV1) standard, the 2nd generation of audio video coding standard (AVS2) or the next-generation video/image coding standard (e.g., 0.267 or H.268).

In the present disclosure, various embodiments of video/image coding are provided and embodiments of the present disclosure, which are not described, may be performed in combination.

In the present disclosure, a "video" may mean a set of images over time. A "picture" generally refers to a unit representing one image at a specific time, and a slice/tile is a coding unit constituting a portion of a picture in coding. A slice/tile may include one or more coding tree units (CTUs). The CTU may be partitioned into one or more CUs.

One picture may consist of one or more slices/tiles. A tile is a rectangular area within a particular tile row and a particular tile column in a picture and may consist of a plurality of CTUs. The tile column may be defined as a rectangular area of CTUs and may have a height equal to the height of the picture and a width specified by a syntax element signaled from a bitstream portion such as a picture parameter set. The tile row may be defined as a rectangular area of CTUs and may have a width equal to the width of the picture and a height specified by a syntax element signaled from a bitstream portion such as a picture parameter set.

A tile scan is a specific sequential ordering of CTUs partitioning a picture. Here, the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture. The slice may be exclusively contained in a single NAL unit.

One picture may be partitioned into two or more subpictures. The subpicture may be a rectangular region of one or more slices in the picture.

One picture may include one or more tile groups. One tile group may include one or more tiles. A brick may represent a rectangular region of CTU rows within a tile in a picture. One tile may include one or more bricks. The brick may represent a rectangular region of CTU rows in a tile. One tile may be partitioned into a plurality of bricks and each brick may include one or more CTU rows belonging to a tile. A tile which is not partitioned into a plurality of bricks may also be treated as a brick.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma blocks (e.g., Cb and Cr). The unit may be used interchangeably with the terms such as "sample array", "block" or "area" in some cases. In a general case, an M×N block may include a set (or array) of samples (or a sample array) or transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A and B" may mean "only A", "only B" or "both A and B". In addition, in the disclosure, "at least one of A or B" or "at least one of A and/or B" may be interpreted as being the same as "at least one of A and B".

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a source device 10 and a reception device 20. The source device 10 may deliver encoded video and/or image information or data to the reception device 20 in the form of a file or streaming via a digital storage medium or network.

The source device 10 according to an embodiment may include a video source generator 11, an encoding device 12 and a transmitter 13. The reception device 20 according to an embodiment may include a receiver 21, a decoding device 22 and a renderer 23. The encoding device 12 may be called a video/image encoding device, and the decoding device 22 may be called a video/image decoding device. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
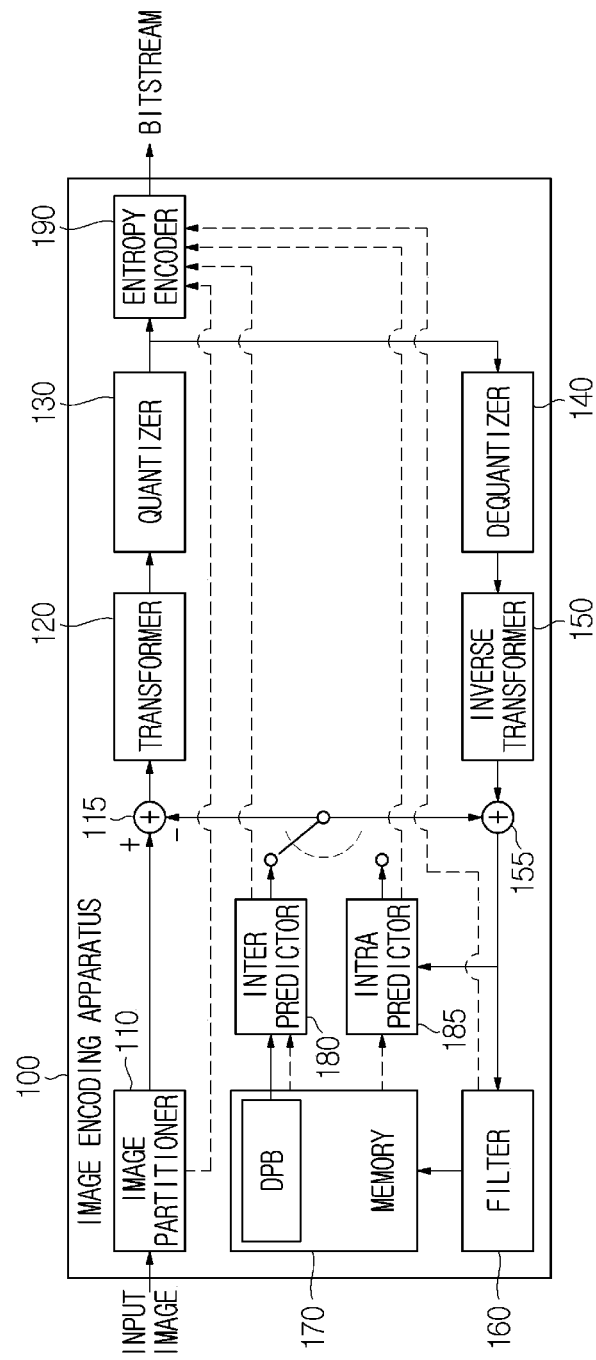
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
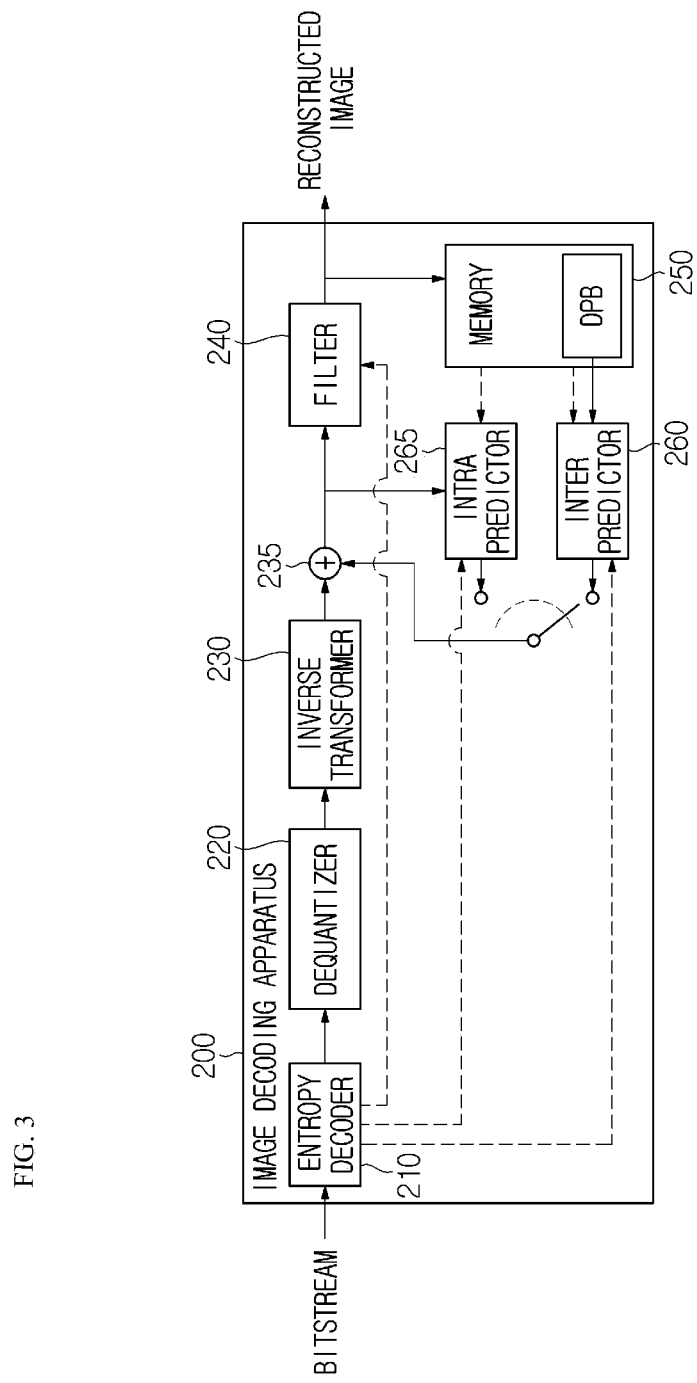
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
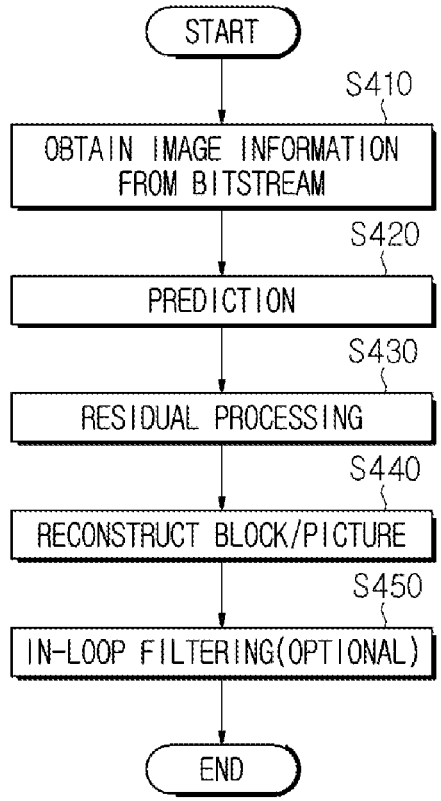
FIGS. 4 and 5 are views showing an example of a picture decoding and encoding procedure according to an embodiment.

FIG. 4 shows an example of a schematic picture decoding procedure, to which embodiment(s) of the present disclosure is applicable. In FIG. 4, S410 may be performed in the entropy decoder 210 of the decoding apparatus, S420 may be performed in a predictor including the intra predictor 265 and the inter predictor 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure (S410) for obtaining image/video information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
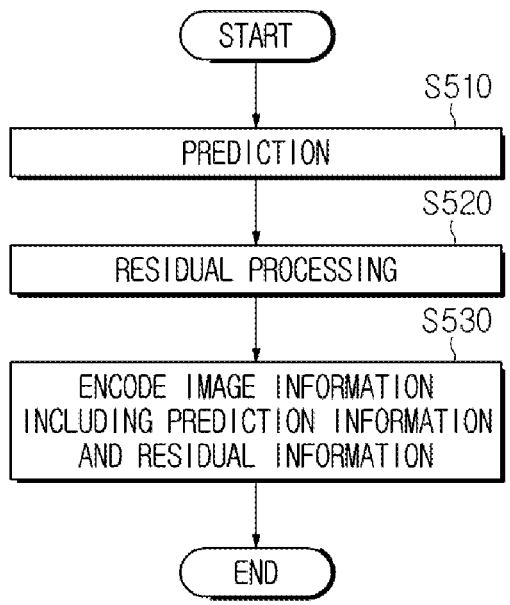
Figure 6:
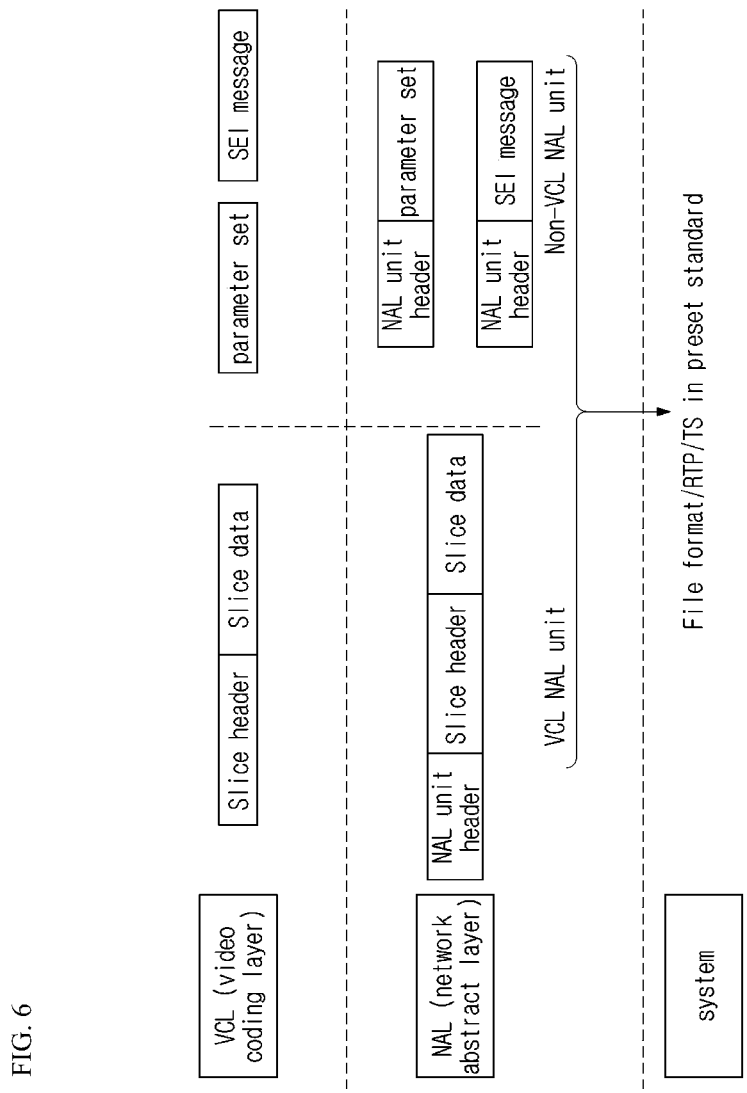
FIG. 6 is a view showing a layer structure for a coded image according to an embodiment.

FIG. 5 shows an example of a schematic picture encoding procedure, to which embodiment(s) of the present disclosure is applicable. In FIG. 5, S510 may be performed in the predictor including the intra predictor 185 or inter predictor 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S510 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 20:
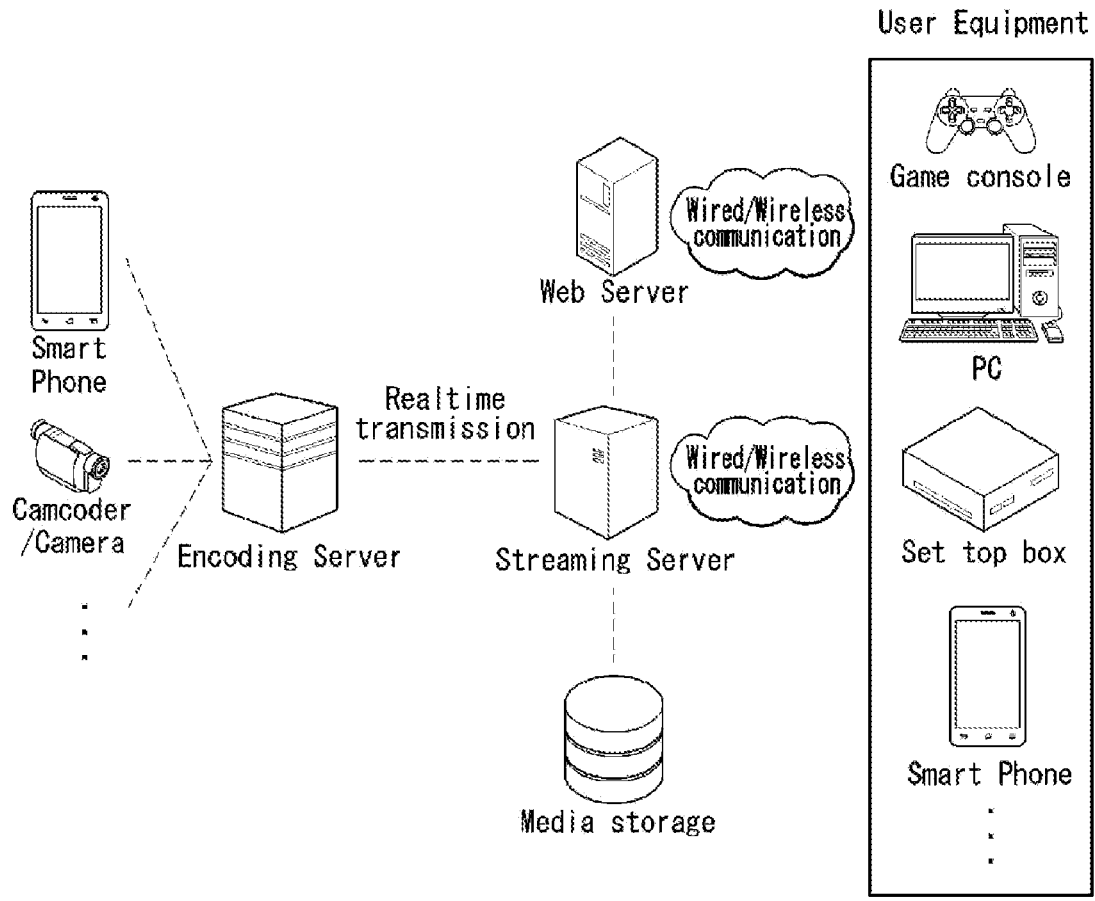
FIG. 20 is a view showing a content streaming system, to which an embodiment of the present disclosure is applicable.

FIG. 20 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit: Type for NAL unit including DCI
  VPS (Video Parameter Set) NAL unit: Type for NAL unit including VPS
  SPS(Sequence Parameter Set) NAL unit: Type for NAL unit including SPS
  PPS (Picture Parameter Set) NAL unit: Type for NAL unit including PPS
  APS (Adaptation Parameter Set) NAL unit: Type for NAL unit including APS
  PH (Picture header) NAL unit: Type for NAL unit including PH The above-described NAL unit types may have syntax information for a NAL unit type, and the syntax information may be stored in a NAL unit header and signaled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 7:
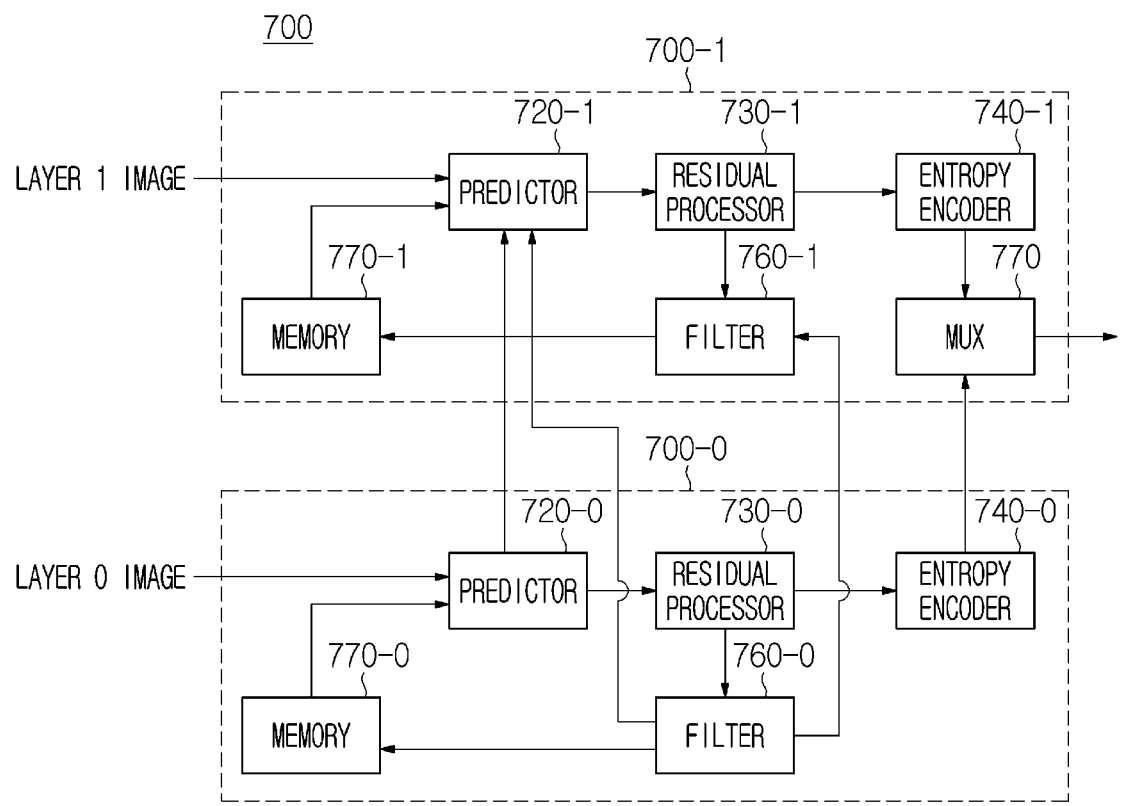
FIGS. 7 to 10 are views illustrating multi-layer based encoding and decoding.

FIG. 7 is a schematic block diagram of a multi-layer encoding apparatus 700, to which embodiment(s) of the present disclosure is applicable, and, in which encoding of a multi-layer video/image signal is performed.

The multi-layer encoding apparatus 700 of FIG. 7 may include the encoding apparatus of FIG. 2. Compared to FIG. 2, the image partitioner 110 and the adder 155 are not shown in the multi-layer encoding apparatus 700 of FIG. 7, the multi-layer encoding apparatus 700 may include the image partitioner 110 and the adder 155. In an embodiment, the image partitioner 110 and the adder 155 may be included in unit of layer. Hereinafter, multi-layer based prediction will be focused upon in the description of FIG. 7. For example, in addition to the following description, the multi-layer encoding apparatus 700 may include the technical idea of the encoding apparatus described above with reference to FIG. 2.

For convenience of description, a multi-layer structure consisting of two layers is shown in FIG. 7. However, the embodiments of the present disclosure are not limited to two layers and the multi-layer structure, to which the embodiment of the present disclosure is applied, may include two or more layers.

Referring to FIG. 7, the encoding apparatus 700 includes an encoder 700-1 of layer 1 and an encoder 700-0 of layer 0. Layer 0 may be a base layer, a reference layer or a lower layer, and layer 1 may be an enhancement layer, a current layer or a higher layer.

The encoder 700-1 of layer 1 may include a predictor 720-1, a residual processor 730-1, a filter 760-1, a memory 770-1, an entropy encoder 740-1 and a multiplexer (MUX) 770. In an embodiment, the MUX may be included as an external component.

The encoder 700-0 of layer 0 may include a predictor 720-0, a residual processor 730-0, a filter 760-0, a memory 770-0 and an entropy encoder 740-0.

The predictors 720-0 and 720-1 may perform prediction with respect to input images based on various prediction schemes as described above. For example, the predictors 720-0 and 720-1 may perform inter prediction and intra prediction. The predictors 720-0 and 720-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 720-0 and 720-1 may generate a predicted block based on the reference block.

In addition, the predictor 720-1 may perform prediction for layer 1 using information on layer 0. In the present disclosure, a method of predicting information on a current layer using information on another layer is referred to as inter-layer prediction, for convenience of description.

Information on a current layer predicted using information on another layer (e.g., predicted by inter-layer prediction) may be at least one of texture, motion information, unit information or a predetermined parameter (e.g., a filtering parameter, etc.).

In addition, information on another layer used for prediction of the current layer (e.g., used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 720-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 720-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 720-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 720-1 may use only a sample value of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 220-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 220-1 may use a motion vector specified by the inter-layer reference picture as a motion vector predictor for deriving the motion vector of the current block. In addition, the predictor 220-1 may use a motion vector specified by the inter-layer reference picture as the motion vector of the current block.

When both the sample value and motion information of the inter-layer reference picture are used, the predictor 220-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 8:
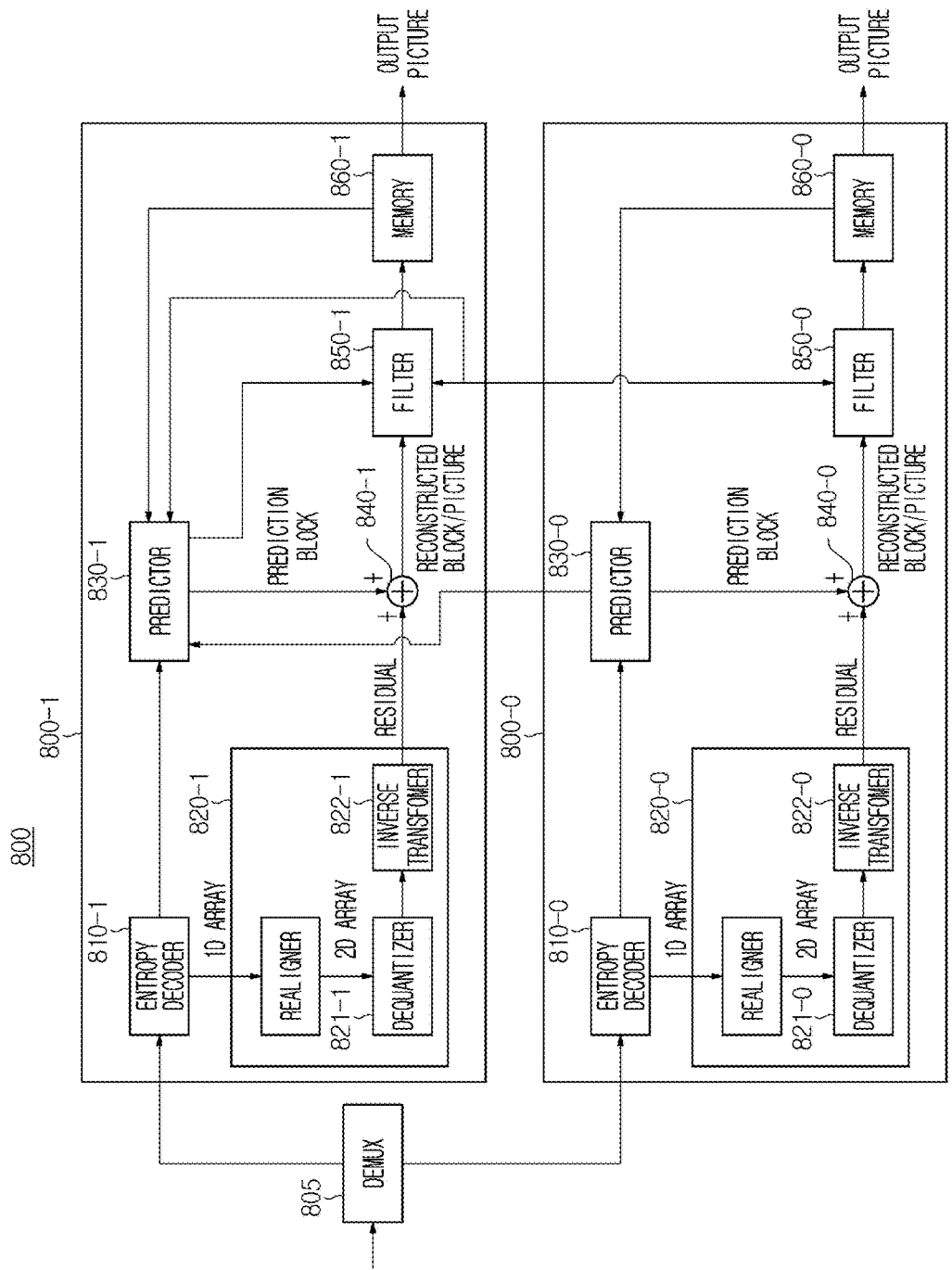

FIG. 8 is a schematic block diagram of a decoding apparatus, to which embodiment(s) of the present disclosure is applicable, and, in which decoding of a multi-layer video/image signal is performed. The decoding apparatus of FIG. 8 may include the decoding apparatus of FIG. 3. A realigner shown in FIG. 8 may be omitted or included in a dequantizer. In the description of this drawing, multi-layer based prediction will be focused upon. In addition, the description of the decoding apparatus of FIG. 3 may be included.

In the example of FIG. 8, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 8, the decoding apparatus 800 may include a decoder 800-1 of layer 1 and a decoder 800-0 of layer 1. The decoder 800-1 of layer 1 may include an entropy decoder 810-1, a residual processor 820-1, a predictor 830-1, an adder 840-1, a filter 850-1 and a memory 860-1. The decoder 800-2 of layer 0 may include an entropy decoder 810-0, a residual processor 820-0, a predictor 830-0, an adder 840-0, a filter 850-0 and a memory 860-0.

When a bitstream including image information is received from the encoding apparatus, a DEMUX 805 may demultiplex information for each layer and transmit the information to the decoding apparatus for each layer.

The entropy decoders 810-1 and 810-0 may perform decoding in correspondence with a coding method used in the encoding apparatus. For example, when CABAC is used in the encoding apparatus, the entropy decoders 810-1 and 810-0 may perform entropy decoding using CABAC.

When a prediction mode for a current block is an intra prediction mode, the predictors 830-1 and 830-0 may perform intra prediction for the current block based on neighboring reconstructed samples in the current picture.

When an prediction mode for a current block is an inter prediction mode, the predictors 830-1 and 830-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 830-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 800 may perform inter-layer prediction as described in the multi-layer encoding apparatus 2100. For example, the multi-layer decoding apparatus 200 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the multi-layer encoding apparatus 2100 and inter-layer prediction applicable in the present disclosure is not limited thereto.

The predictor 830-1 may perform inter-layer prediction using an inter-layer reference picture, when a reference picture index received from the encoding apparatus or a reference picture index derived from a neighboring block indicates an inter-layer reference picture in a reference picture list. For example, the predictor 830-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 830-1 may perform inter prediction for the current block using the inter-layer reference picture.

As described above in the multi-layer encoding apparatus 700, in operation of the multi-layer decoding apparatus 800, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 700, in operation of the multi-layer decoding apparatus 800, a reconstructed picture of a reference layer, from which an inter-layer reference picture is derived, may be a picture belonging to the same AU as a current picture to be encoded.

In addition, as described above in the multi-layer encoding apparatus 700, in operation of the multi-layer decoding apparatus 800, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 700, in operation of the multi-layer decoding apparatus 800, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 700, in operation of the multi-layer decoding apparatus 800, as information on an inter-layer reference picture, only a sample value may be used, only motion information (motion vector) may be used or both a sample value and motion information may be used.

The multi-layer decoding apparatus 800 may receive a reference index indicating an inter-layer reference picture in a reference picture list from the multi-layer encoding apparatus 700 and perform inter-layer prediction based on the same. In addition, the multi-layer decoding apparatus 800 may receive, from the multi-layer encoding apparatus 700, information for specifying which information (sample information, motion information or sample information and motion information) is used from the inter-layer reference picture, that is, information for specifying a dependency type of dependency for inter-layer prediction between two layers.

An image encoding method and a decoding method respectively performed by a multi-layer image encoding apparatus and a multi-layer image decoding apparatus according to an embodiment will be described with reference to FIGS. 9 and 10. Hereinafter, for convenience of description, a multi-layer image encoding apparatus is referred to as an image encoding apparatus. In addition, a multi-layer image decoding apparatus is referred to as an image decoding apparatus.

Figure 9:
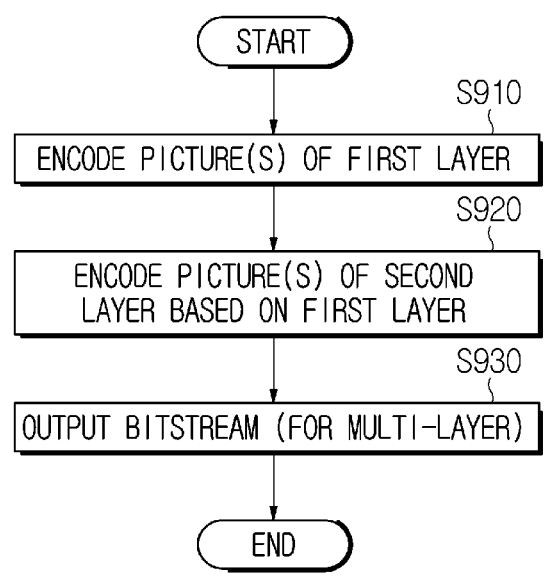

FIG. 9 is a view illustrating a method of encoding an image based on a multi-layer by an image encoding apparatus according to an embodiment. The encoding apparatus according to an embodiment may encode picture(s) of a first layer (S910). Next, the encoding apparatus may encode picture(s) of a second layer based on the first layer (S920). Next, the encoding apparatus may output a bitstream (for the multi-layer) (S930).

Figure 10:
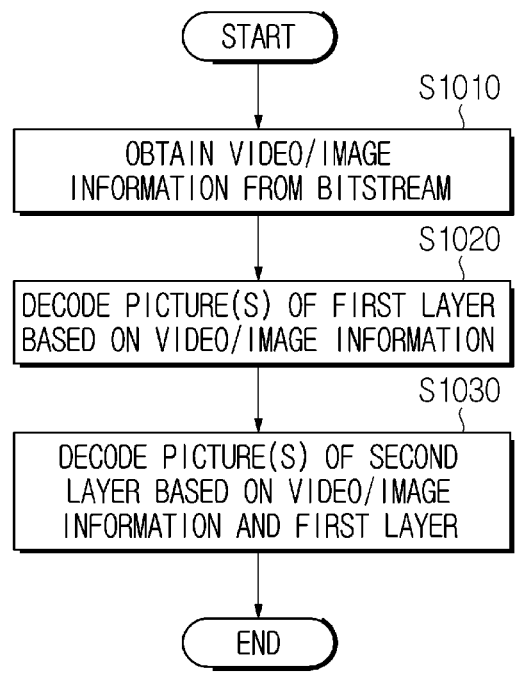

FIG. 10 is a view illustrating a method of decoding an image based on a multi-layer by an image decoding apparatus according to an embodiment. The decoding apparatus according to an embodiment may obtain video/image information from a bitstream (S1010). Next, the decoding apparatus may decode picture(s) of a first layer based on video/image information (S1020). Next, the decoding apparatus may decode picture(s) of a second layer based on the video/image information and the first layer (S1030).

In an embodiment, the video/image information may include a high level syntax (HLS) described below. In an embodiment, the HLS may include an SPS and/or a PPS as disclosed in the present disclosure. For example, the video/image information may include information and/or syntax elements described in the present disclosure. As described in the present disclosure, the picture(s) of the second layer may be encoded based on motion information/reconstructed sample/parameters of the picture(s) of the first layer. In an embodiment, the first layer may be lower than the second layer. In an embodiment, when the second layer is a current layer, the first layer may be referenced as a reference layer.

High Level Syntax (HLS) Signaling and Semantics

As described above, a HLS may be encoded and/or signaled for video and/or image encoding. As described above, the video/image information of the present disclosure may be included in the HLS. In addition, the image/video encoding method may be performed based on such image/video information.

Video Parameter Set Signaling

A video parameter set (VPS) is a parameter set which is used for the carriage of layer information. The layer information may include, for example, information on an output layer set (OLS), information on a profile tier level, information on a relationship between an OLS and a hypothetical reference decoder and information on a relationship between an OLS and a decoded picture buffer (DPB).

A VPS raw byte sequence payload (RBSP) shall be available to a decoding process prior to it being referenced, included in at least one access unit (AU) with TemporalId equal to 0 or provided through external means. All VPS NAL units with a particular value of vps_video_parameter_set_id in a coded video sequence (CVS) shall have the same content.

FIG. 11 is a view illustrating a portion of the syntax of a VPS according to an embodiment. A video parameter set (VPS) is a parameter set used to transmit layer information. Hereinafter, syntax elements which may be signaled through the VPS will be described with reference to FIG. 11.

vps_video_parameter_set_id provides an identifier for the VPS. Other syntax elements may refer to the VPS using vps_video_parameter_set_id. The value of vps_video_parameter_set_id shall be greater than 0.

vps_max_layers_minus1 may specify the maximum allowed number of layers in each CVS referring to the VPS. For example, vps_max_layers_minus1 plus 1 may specify the maximum allowed number of layers in each CVS referring to the VPS.

vps_max_sublayers_minus1 plus 1 may specify the maximum number of temporal sublayers that may be present in a layer in each CVS referring to the VPS.

vps_all_layers_same_num_sublayers_flag equal to 1 may specify that the number of temporal sublayers is the same for all the layers in each CVS referring to the VPS. vps_all_layers_same_num_sublayers_flag equal to 0 may specify that the number of temporal sublayers may be the same or different for the layers in each CVS referring to the VPS. When the value of vps_all_layers_same_num_sublayers_flag is not provided in a bitstream, the value of vps_all_layers_same_num_sublayers_flag may be derived to be equal to 1.

vps_all_independent_layers_flag equal to 1 may specify that all layers in the CVS are independently coded without using inter-layer prediction. vps_all_independent_layers_flag equal to 0 may specify that one or more of the layers in the CVS may be coded using inter-layer prediction.

vps_layer_id[i] may specify the nuh_layer_id value of the i-th layer. For any two non-negative integer values of m and n, when m is less than n, the value of vps_layer_id[m] shall be less than vps_layer_id[n]. Here, nuh_layer_id is a syntax element signaled in a NAL unit header, and may specify the identifier of the NAL unit.

vps_independent_layer_flag[i] equal to 1 may specify that the layer with index i does not use inter-layer prediction. vps_independent_layer_flag[i] equal to 0 may specify that the layer with index i may use inter-layer prediction and the syntax elements vps_direct_ref_layer_flag[i][j] may be obtained from the VPS. Here, j may be in the range of 0 to i-1, inclusive. When the value of vps_independent_layer_flag[i] is not present in a bitstream, the value of vps_independent_layer_flag[i] may be derived to be equal to 1.

vps_direct_ref_layer_flag[i][j] equal to 0 may specify that the layer with index j is not a direct reference layer for the layer with index i. vps_direct_ref_layer_flag [i][j] equal to 1 may specify that the layer with index j is a direct reference layer for the layer with index i. When the value of vps_direct_ref_layer_flag[i][j] is not obtained from the bitstream for i and j in the range of 0 to vps_max_layers_minus1, inclusive, the value thereof may be derived to be equal to 0. When vps_independent_layer_flag[i] is equal to 0, there shall be at least one value of j in the range of 0 to i-1, inclusive, such that the value of vps_direct_ref_layer_flag [i][j] is equal to 1.

In an embodiment, the variables NumDirectRefLayers[i], DirectRefLayerIdx[i][d], NumRefLayers[i], RefLayerIdx[i][r], and LayerUsedAsRefLayerFlag[j] are derived using the pseudo code of FIG. 26.

The variable GeneralLayerIdx[i], specifying the layer index of the layer with the nuh_layer_id equal to vps_layer_id[i], may be derived as shown in the following equation.

$$\text{for}(i=0;i<=\text{vps\_max\_layers\_minus1};i++)$$

$$\text{GeneralLayerIdx}[\text{vps\_layer\_id}[i]]=i \quad \text{[Equation 1]}$$

Sequence Parameter Set Signaling

FIG. 13 is a view illustrating a portion of the syntax of an SPS according to an embodiment. A sequence parameter set (SPS) is a parameter set used to transmit information for coding a video sequence. All SPS RBSPs shall be available to a decoding process prior to it being referenced. This may be included in at least one AU with TemporalId equal to 0 or provided through external means.

Hereinafter, syntax elements which may be signaled through the SPS will be described with reference to FIG. 13.

A syntax element sps_seq_parameter_set_id provides the identifier of the SPS for reference from another syntax element. Regardless of the nuh_layer_id value, SPS NAL units may share the same value space of sps_seq_parameter_set_id.

Assume that the value of nuh_layer_id of a particular SPS NAL unit is spsLayerId and the value of nuh_layer_id of a particular VCL NAL unit is vclLayerId. In this case, unless a layer with spsLayerId equal to or less than vclLayerId and nuh_layer_id equal to spsLayerId is included in at least one output layer set including a layer with nuh_layer_id equal to vclLayerId, a particular VCL NAL unit shall not refer to a particular SPS NAL unit.

When the value of sps_video_parameter_set_id is greater than 0, a syntax element sps_video_parameter_set_id may specify the value of vps_video_parameter_set_id for the VPS referred to by the SPS.

When the value of sps_video_parameter_set_id is equal to 0, the following is applicable.

The SPS does not refer to the VPS.

In a process of decoding each CLVS referring to the SPS, any VPS is not referred to.

The value of vps_max_layers_minus1 is derived to be equal to 0.

A CVS includes only one layer. For example, all VCL NAL units in the CVS shall have the same nuh_layer_id value.

The value of GeneralLayerIdx[nuh_layer_id] may be derived to be equal to 0.

The value of vps_independent_layer_flag[GeneralLayerIdx[nuh_layer_id] ] may be derived to be equal to 1.

When the value of vps_independent_layer_flag[GeneralLayerIdx[nuh_layer_id] ] is equal to 1, the SPS referred to by the CLVS with nuhLayerId as the nuh_layer_id value shall have nuh_layer_id equal to nuhLayerId.

The value of sps_video_parameter_set_id may be equally set in all SPSs referred to by the CLVS in the CVS.

res_change_in_clvs_allowed_flag_equal to 1 may specify that picture resolution in the CLVS referring to the SPS may be changed. res_change_in_clvs_allowed_flag equal to 0 may specify that picture resolution in any CLVS referring to the SPS may not be changed.

pic_width_max_in_luma_samples may specify the maximum width of each decoding picture referring to the SPS in luma sample unit. pic_width_max_in_luma_samples may not be equal to 0 and may be equal to an integer multiple of max(8, MinCbSizeY).

When the value of sps_video_parameter_set_id is greater than 0, for bitstream conformance, for all OLSs including at least one layer referring to the SPS, when the OLS index i of the OLS is i, the value of pic_width_max_in_luma_samples shall be equal to or less than ols_dpb_pic_width[i].

pic_height_max_in_luma_samples may specify the maximum height of each decoding picture referring to the SPS in luma sample unit. pic_height_max_in_luma_samples may not be equal to 0 and may be equal to an integer multiple of max(8, MinCbSizeY).

When the value of sps_video_parameter_set_id is greater than 0, for bitstream conformance, for all OLSs including at least one layer referring to the SPS, when the OLS index i of the OLS is i, the value of pic_height_max_in_luma_samples shall be equal to or less than ols_dpb_pic_width[i].

Picture Parameter Set Signaling

FIG. 14 is a view illustrating a portion of the syntax of a PPS according to an embodiment. A picture parameter set (PPS) is a parameter set used to transmit information for coding a picture. A PPS RBSP shall be available to a decoding process prior to it being referenced. This may be included in at least one AU with TemporalId equal to or less than 0 or provided through external means.

Hereinafter, syntax elements which may be signaled through the PPS will be described with reference to FIG. 14. A syntax element pps_pic_parameter_set_id may specify a PPS to be referred to by another syntax element. The value of pps_pic_parameter_set_id may be in the range of 0 to 63, inclusive. Regardless of the value of nuh_layer_id, a PPS NAL unit may share the same value space of pps_pic_parameter_set_id.

Assume that the value of nuh_layer_id of a particular PPS NAL unit is ppsLayerId and the value of nuh_layer_id of a particular VCL NAL unit is vclLayerId. In this case, unless a layer with ppsLayerId equal to or less than vclLayerId and nuh_layer_id equal to ppsLayerId is included in at least one output layer set including a layer with the nuh_layer_id equal to vclLayerId, a particular VCL NAL unit shall not refer to a particular PPS NAL unit.

pps_seq_parameter_set_id specify the value of sps_seq_parameter_set_id for the SPS. The value of pps_seq_parameter_set_id may be in the range of 0 to 15, inclusive. The value of pps_seq_parameter_set_id may be the same in all PPSs referred to by an encoded picture in the CLVS.

pic_width_in_luma_samples may specify the width of each decoding picture referring to the PPS in luma sample unit. pic_width_in_luma_samples may not be equal to 0 and may be equal to an integer multiple of Max(8, MinCbSizeY), and shall be equal to or less than pic_width_max_in_luma_samples. Here, Max(8, MinCbSizeY) indicates the larger of 8 and MinCbSizeY, and MinCbSizeY indicates the size of a smallest coding block available in luma sample unit.

When the value of res_change_in_clvs_allowed_flag is equal to 0, the value of pic_width_in_luma_samples shall be equal to pic_width_max_in_luma_samples.

When the value of sps_ref_wraparound_enabled_flag is equal to 1, the value of (CtbSizeY/Min_CbSizeY+1) shall be equal to or less than (pic_width_in_luma_samples/MinCbSizeY−1).

pic_height_in_luma_samples may specify the height of each decoding picture referring to the PPS in luma sample unit. pic_height_in_luma_samples may not be equal to 0 and may be equal to an integer multiple of Max(8, MinCbSizeY) and shall be equal to or less than pic_height_max_in_luma_samples.

When the value of res_change_in_clvs_allowed_flag is equal to 0, the value of pic_height_in_luma_samples shall be equal to pic_height_max_in_luma_samples.

A variable PicWidthInCtbsY indicating the width of the picture of the luma sample unit in coding tree block unit of the luma sample unit, a variable PicHeightInCtbsY indicating the height of the picture of the luma sample unit in coding tree block unit of the luma sample unit, a variable PicSizeInCtbsY indicating the size of the picture of the luma sample unit in coding tree block unit of the luma sample unit, a variable PicWidthInMinCbsY indicating the width of the picture of the luma sample unit in minimum coding tree block unit of the luma sample unit, a variable PicHeightInMinCbsY indicating the height of the picture of the luma sample unit in minimum coding tree block unit of the luma sample unit, a variable PicSizeInMinCbsY indicating the size of the picture of the luma sample unit in minimum coding tree block unit of the luma sample unit, a variable PicSizeInSamplesY indicating the size of the picture in luma sample unit, a variable PicWidthInSamplesC indicating the width of the picture in chroma sample unit, and a variable PicHeightInSamplesC indicating the height of the picture in chroma sample unit may be derived as shown in the following equation.

$$PicWidthInCtbsY = Ceil(pic\_width\_in\_luma\_samples \div CtbSizeY)$$

$$PicHeightInCtbsY = Ceil(pic\_height\_in\_luma\_samples \div CtbSizeY)$$

$$PicSizeInCtbsY = PicWidthInCtbsY * PicHeightInCtbsY$$

$$PicWidthInMinCbsY = pic\_width\_in\_luma\_samples / MinCbSizeY$$

$$PicHeightInMinCbsY = pic\_height\_in\_luma\_samples / MinCbSizeY$$

$$PicSizeInMinCbsY = PicWidthInMinCbsY * PicHeightInMinCbsY$$

$$PicSizeInSamplesY = pic\_width\_in\_luma\_samples * pic\_height\_in\_luma\_samples$$

$$PicWidthInSamplesC = pic\_width\_in\_luma\_samples / SubWidthC$$

$$PicHeightInSamplesC = pic\_height\_in\_luma\_samples / SubHeightC \quad \text{[Equation 2]}$$

In the above Equation, Ceil( ) is a floor function. CtbSizeY represents the size of a coding tree block in luma sample unit and may be obtained from a bitstream. MinCbSizeY represents the size of a minimum coding block in luma sample unit and may be obtained from a bitstream. SubWidthC represents a difference in ratio between a luma block and a chroma block, a ratio of the luma block greater than that of the chroma block may be represented by an integer multiple and may be obtained from a bitstream.

Adaptation Parameter Set Signaling

FIG. 15 is a view illustrating a portion of the syntax of an APS according to an embodiment. An adaptation parameter set (APS) is a parameter set used to transmit information for coding a picture. Hereinafter, syntax elements which may be signaled through the APS will be described with reference to FIG. 15.

Each APS RBSP may be decoded prior to being referenced and may be included in at least one AU with TemporalId equal to or less than TempralId of a coded slice NAL unit referring to the same or provided through external means.

adaptation_parameter_set_id may provide the identifier of the APS to be referred to from another syntax element.

When the value of aps_params_type is equal to ALF_APS or SCALING_APS, the value of adaptation_parameter_set_id may be in the range of 0 to 7, inclusive.

When the value of aps_params_type is equal to LMCS_APS, the value of adaptation_parameter_set_id may be in the range of 0 to 3, inclusive.

Assume that the value of nuh_layer_id of a particular APS NAL unit is apsLayerId and the value of nuh_layer_id of a particular VCL NAL unit is vclLayerId. In this case, unless a layer with apsLayerId equal to or less than vclLayerId and nuh_layer_id equal to apsLayerId is included in at least one output layer set including a layer with the nuh_layer_id equal to vclLayerId, a particular VCL unit shall not refer to a particular APS NAL unit.

aps_params_type may specify the types of APS parameters delivered by the APS as shown in the following table.

TABLE 1

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |

Parameter Reference Problem

According to the above-described embodiment, the following problems may occur.

Problem 1. Even when layerB is not a direct or indirect reference layer of layerA, a picture belonging to layerA which is a predetermined layer may be allowed to refer to refer a parameter belonging to layerB which is another layer. In this case, even when there is no inter-layer reference, as parameter reference occurs, a problem of obtaining a parameter reference result with an unintended value may occur.

Problem 2. For a single layer bitstream, it may not be necessary to provide a VPS. However, even in this case, predetermined information on the VPS may be referred to by using vps_layer_id[0]. Such a value needs to be derived in order to avoid an incorrect value being used by the decoding apparatus even if the VPS is not provided.

Problem 3. As a referenced parameter set has nuh_layer_id less than nuh_layer_id of a picture referring to the same, in an embodiment, a parameter set such as an SPS and a PPS may be shared across a layer. However, when the following constraints are imposed, reference picture resampling is not allowed and sharing of the parameter set may not be properly performed for a multi-layer bitstream having different picture resolutions at different layers.

When the value of res_change_in_clvs_allowed_flag is equal to 0, the value of pic_width_in_luma_samples shall be equal to pic_width_max_in_luma_samples.

When the value of res_change_in_clvs_allowed_flag is equal to 0, the value of pic_height_in_luma_samples shall be equal to pic_height_max_in_luma_samples.

Improvement Method

The following embodiments provide improvement methods for the above-described problems. The following embodiments may be individually implemented or at least some thereof will be combined and implemented.

For Problems 1 and 2, the above-described embodiment may be improved as follows.

Improvement method 1. When a picture with the same nuh_layer_id as layerA refers to a parameter set with the same nuh_layer_id as layerB and layerA and layerB are not the same, layerB shall be a direct or indirect reference layer of layerA.

Improvement method 2. When a picture with the same nuh_layer_id as layerA refers to a parameter set with the same nuh_layer_id as layerB and layerA and layerB are not the same, a current OLS (e.g., an OLS which is being currently decoded) shall include layerA and layerB.

Improvement method 3. When a picture with the same nuh_layer_id as layerA refers to a parameter set with the same nuh_layer_id as layerB and layerA and layerB are not the same, each OLS including layerA shall also include layerB.

Improvement method 4. When a VPS is not provided (e.g., the value of sps_video_parameter_set_id is 0), the value of vps_layer_id[0] shall be derived to be equal to nuh_layer_id of a NAL unit including an SPS.

Improvement method 5. Alternatively, when a VPS is not provided (e.g., the value of sps_video_parameter_set_id is 0), the value of vps_layer_id[0] shall be derived to be equal to 0.

In order to improve Problems 1 and 3, the following improvement methods are applicable. The below-described methods may be used individually or in combination.

Improvement method 6. When reference picture resampling (RPR) is not enabled, the sizes of all pictures in the CLVS shall be the same. For example, when RPR is not enabled, picture sizes (e.g., pic_width_in_luma_samples and pic_height_in_luma_samples) signaled in all PPSs referring to the same SPS shall have the same value.

Improvement method 7. When all of the following conditions are true, maximum picture sizes (e.g., pic_width_max_in_luma_samples and pic_height_max_in_luma_samples) signaled in the reference SPS are the same and signaled picture size may be limited.

RPR is not available.

nuh_layer_id of both the PPS and the SPS referred to thereby are the same.

A layer is an independently coded layer, for example, the value of vps_independent_layer_flag[GeneralLayerIdx [nuh_layer_id]] is equal to 1.

Improvement method 8. When a picture with the same nuh_layer_id as layerA refers to a parameter set with the same nuh_layer_id as layerB and layerA and layerB are not the same, layerB shall be a direct or indirect reference layer of layerA.

Embodiment 1

As an embodiment for implementing Improvement method 1, the following method is applicable.

A variable NumDirectRefLayers[i] indicating the number of direct reference layers of a layer with an i-th index, a variable DirectRefLayerIdx[i][d] indicating the direct reference layer of a layer with an i-th index by an index d from 0 to NumDirectRefLayers [i], a variable NumRefLayers[i] indicating the number of direct reference layers and indirect reference layers of a layer with an i-th index, a variable RefLayerIdx[i][r] indicating the direct reference layer and the indirect reference layer of a layer with an i-th index by an index r from 1 to NumRefLayers[i], a variable DependencyFlag[i][j] indicating whether a layer with an index i directly or indirectly refers to a layer with an index j, and a variable LayerUsedAsRefLayerFlag[j] indicating whether a layer with an index j is referred to from another layer may be derived as shown in FIG. 30.

In addition, SPS constraint 1 related to the above-described syntax element sps_seq_parameter_set_id may be replaced and applicable along with SPS constraint 2.

<SPS Constraint 1>

Assume that the value of nuh_layer_id of a particular SPS NAL unit is spsLayerId and the value of nuh_layer_id of a particular VCL NAL unit is vclLayerId. In this case, unless a layer with spsLayerId equal to or less than vclLayerId and nuh_layer_id equal to spsLayerId is included in at least one output layer set including a layer with the nuh_layer_id equal to vclLayerId, a particular VCL NAL unit shall not refer to a particular SPS NAL unit.

<SPS Constraint 2>

Assume that the value of nuh_layer_id of a predetermined SPS NAL unit is spsLayerId and the value of nuh_layer_id of a predetermined VCL NAL unit is vclLayerId. When all of the following conditions are not satisfied, the predetermined VCL NAL unit shall not refer to the predetermined SPS NAL unit.

spsLayerI d is equal to or less than vclLayerId.

A layer with the nuh_layer_id equal to spsLayerId is included in at least one OLS including a layer with the nuh_layer_id equal to vclLayerId.

The value of DependencyFlag[vclLayerId][spsLayerId] is equal to 1

In addition, PPS1 constraint related to the above-described syntax element pps_pic_parameter_set_id may be replaced and applicable along with PPS2 constraint.

<PPS Constraint 1>

Assume that the value of nuh_layer_id of a particular PPS NAL unit is ppsLayerId and the value of nuh_layer_id of a particular VCL NAL unit is vclLayerId. In this case, unless a layer with ppsLayerId equal to or less than vclLayerId and nuh_layer_id equal to ppsLayerId is included in at least one output layer set including a layer with the nuh_layer_id equal to vclLayerId, a particular VCL NAL unit shall not refer to a particular PPS NAL unit.

<PPS Constraint 2>

Assume that the value of nuh_layer_id of a particular PPS NAL unit is ppsLayerId and the value of nuh_layer_id of a particular VCL NAL unit is vclLayerId. In this case, unless all of the following conditions are satisfied, the particular VCL NAL unit shall not refer to the particular PPS NAL unit.

ppsLayerId is equal to or less than vclLayerId.

A layer with the nuh_layer_id equal to ppsLayerId is included in at least one OLS including a layer with the nuh_layer_id equal to vclLayerId.

The value of DependencyFlag[vclLayerId][ppsLayerId] is equal to 1.

As described in the present embodiment, by replacing and imposing constraints on the SPS and the PPS, when a picture with the same nuh_layer_id as layerA refers to a parameter set with the same nuh_layer_id as layerB and layerA and layer B are not the same, layerB shall be a direct or indirect reference layer of layerA. Therefore, Problems 1 and 2 described above may be solved.

[i], RefLayerIdx[i][r], DependencyFlag[i][j], and LayerUsedAsRefLayerFlag[j] may be derived as shown in FIG. 30.

In addition, SPS constraint 1 related to the above-described syntax element sps_seq_parameter_set_id may be replaced and applicable along with SPS constraint 3.

<SPS Constraint 3>

Assume that the value of nuh_layer_id of a predetermined SPS NAL unit is spsLayerId and the value of nuh_layer_id of a predetermined VCL NAL unit is vclLayerId. When all of the following conditions are not satisfied, the predetermined VCL NAL unit shall not refer to the predetermined SPS NAL unit.

spsLayerId is equal to vclLayerId.

The value of DependencyFlag[vclLayerId][spsLayerId] is equal to 1.

In addition, PPS constraint 1 related to the above-described syntax element pps_pic_parameter_set_id may be replaced and applicable along with PPS constraint 3.

<PPS Constraint 3>

Assume that the value of nuh_layer_id of a particular PPS NAL unit is ppsLayerId and the value of nuh_layer_id of a particular VCL NAL unit is vclLayerId. In this case, unless all of the following conditions are satisfied, the particular VCL NAL unit shall not refer to the particular PPS NAL unit.

ppsLayerId is equal to ppsLayerId.

The value of DependencyFlag[vclLayerId][ppsLayerId] is equal to 1.

In addition, APS constraint 1 related to the above-described syntax element adaptation_parameter_set_id may be replaced and applicable along with APS constraint 2.

<APS Constraint 1>

Assume that the value of nuh_layer_id of a particular APS NAL unit is apsLayerId and the value of nuh_layer_id of a particular VCL NAL unit is vclLayerId. In this case, unless a layer with apsLayerId equal to or less than vclLayerId and nuh_layer_id equal to apsLayerId is included in at least one output layer set including a layer with the nuh_layer_id equal to vclLayerId, a particular VCL unit shall not refer to a particular APS NAL unit.

<APS Constraint 2>

Assume that the value of nuh_layer_id of a particular APS NAL unit is apsLayerId and the value of nuh_layer_id of a particular VCL NAL unit is vclLayerId. In this case, unless all of the following conditions are satisfied, the particular VCL NAL unit shall not refer to the particular APS NAL unit.

apsLayerId is equal to vclLayerId.

The value of DependencyFlag[vclLayerId][apsLayerId] is equal to 1.

As described in the present embodiment, by replacing and imposing constraints on the SPS, the PPS and the APS, when a picture with the same nuh_layer_id as layerA refers to a parameter set with the same nuh_layer_id as layerB and layerA and layer B are not the same, layerB shall be a direct or indirect reference layer of layerA. Therefore, Problems 1 and 2 described above may be solved.

Embodiment 2

As another embodiment for implementing Improvement method 1, the following method is applicable.

First, as described in Embodiment 1, variables NumDirectRefLayers[i], DirectRefLayerIdx[i][d], NumRefLayers Embodiment 3

As an embodiment for implementing Improvement methods 2 and 3, the following method is applicable. For example, constraint SPS1 related to the above-described syntax element sps_seq_parameter_set_id may be replaced and applicable along with SPS constraint 4 or SPS constraint 5

<SPS Constraint 4>

Assume that the value of nuh_layer_id of a predetermined SPS NAL unit is spsLayerId and the value of nuh_layer_id of a predetermined VCL NAL unit is vclLayerId. When all of the following conditions are not satisfied, the predetermined VCL NAL unit shall not refer to the predetermined SPS NAL unit.

spsLayerId is equal to or less than vclLayerId.

An OLS which is being currently decoded includes a layer with the nuh_layer_id equal to spsLayerId and a layer with nuh_layer_id equal to vclLayerId.

<SPS Constraint 5>

Assume that the value of nuh_layer_id of a predetermined SPS NAL unit is spsLayerId and the value of nuh_layer_id of a predetermined VCL NAL unit is vclLayerId. When all of the following conditions are not satisfied, the predetermined VCL NAL unit shall not refer to the predetermined SPS NAL unit.

spsLayerId is equal to or less than vclLayerId.

For each OLS specified by a VPS including a layer with the nuh_layer_id equal to vclLayerId, the OLS includes a layer with nuh_layer_id equal to spsLayerId.

In addition, constraint PPS1 related to the above-described syntax element pps_pic_parameter_set_id may be replaced and applicable along with PPS constraint 4 or PPS constraint 5.

<PPS Constraint 4>

Assume that the value of nuh_layer_id of a particular PPS NAL unit is ppsLayerId and the value of nuh_layer_id of a particular VCL NAL unit is vclLayerId. In this case, unless all of the following conditions are satisfied, the particular VCL NAL unit shall not refer to the particular PPS NAL unit.

ppsLayerId is equal to or less than vclLayerId.

An OLS which is being currently decoded includes a layer with the nuh_layer_id equal to ppsLayerId and a layer with nuh_layer_id equal to vclLayerId.

<PPS Constraint 5>

Assume that the value of nuh_layer_id of a particular PPS NAL unit is ppsLayerId and the value of nuh_layer_id of a particular VCL NAL unit is vclLayerId. In this case, unless all of the following conditions are satisfied, the particular VCL NAL unit shall not refer to the particular PPS NAL unit.

ppsLayerId is equal to or less than vclLayerId.

For each OLS specified by a VPS including a layer with the nuh_layer_id equal to vclLayerId, the OLS includes a layer with nuh_layer_id equal to ppsLayerId.

In addition, APS constraint 1 related to the above-described syntax element adaptation_parameter_set_id may be replaced and applicable along with APS constraint 3 or APS constraint 4.

<APS Constraint 3>

Assume that the value of nuh_layer_id of a particular APS NAL unit is apsLayerId and the value of nuh_layer_id of a particular VCL NAL unit is vclLayerId. In this case, unless all of the following conditions are satisfied, the particular VCL NAL unit shall not refer to the particular APS NAL unit.

apsLayerId is equal to or less than vclLayerId.

An OLS which is being currently decoded includes a layer with the nuh_layer_id equal to apsLayerId and a layer with nuh_layer_id equal to vclLayerId.

<APS Constraint 4>

Assume that the value of nuh_layer_id of a particular APS NAL unit is apsLayerId and the value of nuh_layer_id of a particular VCL NAL unit is vclLayerId. In this case, unless all of the following conditions are satisfied, the particular VCL NAL unit shall not refer to the particular APS NAL unit.

apsLayerId is equal to or less than vclLayerId.

For each OLS specified by a VPS including a layer with the nuh_layer_id equal to vclLayerId, the OLS includes a layer with nuh_layer_id equal to apsLayerId.

In an embodiment, constraint 4 on the SPS, constraint 4 on the PPS and constraint 3 on APS are applicable together. In another embodiment, constraint 5 on the SPS, constraint 5 on the PPS and constraint 4 on the APS are applicable together.

As described in the present embodiment, by replacing and imposing constraints on the SPS, the PPS and the APS, when a picture with the same nuh_layer_id as layerA refers to a parameter set with the same nuh_layer_id as layerB and layerA and layer B are not the same, a current OLS (e.g., an OLS which is being currently decoded) shall include layerA and layerB or, when a picture with the same nuh_layer_id as layerA refers to a parameter set with the same nuh_layer_id as layerB and layerA and layerB are not the same, each OLS including layerA shall include layerB together. Therefore, Problems 1 and 2 described above may be solved.

Embodiment 4

As an embodiment for implementing Improvement method 4, the following method is applicable. For example, when the value of sps_video_parameter_set_id is 0, the following is applicable.

The SPS does not refer to the VPS.

In a process of decoding each CLVS referring to the SPS, any VPS is not referred to.

The value of vps_max_layers_minus1 is derived to be equal to 0.

A CVS includes only one layer. For example, all VCL NAL units in the CVS shall have the same nuh_layer_id value.

The value of GeneralLayerIdx[nuh_layer_id] may be derived to be equal to 0.

The value of vps_independent_layer_flag[GeneralLayerIdx[nuh_layer_id] ] may be derived to be equal to 1.

The value of vps_layer_id[0] may be derived to be equal to nuh_layer_id.

As described in the present embodiment, by adding the constraint on the SPS, when the VPS is not provided, the value of vps_layer_id[0] shall be derived to be equal to nuh_layer_id of a NAL unit including the SPS. Therefore, Problems 1 and 2 described above may be solved.

Embodiment 5

As an embodiment for implementing Improvement methods 6, 7 and 8, the following method is applicable.

First, as described in Embodiment 1, variables NumDirectRefLayers[i], DirectRefLayerIdx[i][d], NumRefLayers[i], RefLayerIdx[i][r], DependencyFlag[i][j], and LayerUsedAsRefLayerFlag[j] may be derived as shown in FIG. 16.

In addition, SPS constraint 1 related to the above-described syntax element sps_seq_parameter_set_id may be replaced and applicable along with 01SPS2 constraint as described in Embodiment 1.

In addition, PPS constraint 1 related to the above-described syntax element pps_pic_parameter_set_id may be replaced and applicable along with PPS constraint 2 as described in Embodiment 1.

In addition, the value of pic_width_in_luma_samples may be derived as follows unlike the above description.

For example, when the value of res_change_in_clvs_allowed_flag is equal to 0, the value of pic_width_in_luma_samples shall have the same value for all PPSs referred to by coded pictures in the CLVS.

When all of the following conditions are true, the value of pic_width_in_luma_samples shall be equal to that of pic_width_max_in_luma_samples.

The value of res_change_in_clvs_allowed_flag is equal to 0.

ppsLayerId is equal to the value of nuh_layer_id of the referenced SPS.

The value of vps_independent_layer_flag[GeneralLayerIdx[ppsLayerId] ] is equal to 1.

In addition, the value of pic_height_in_luma_samples may be derived as follows unlike the above description.

For example, when the value of res_change_in_clvs_allowed_flag is equal to 0, the value of pic_height_in_luma_samples shall have the same value for all PPSs referred to by coded pictures in the CLVS.

When the value of res_change_in_clvs_allowed_flag is equal to 0 and the value of vps_independent_layer_flag [GeneralLayerIdx[ppsLayerId] ] is equal to 1, the value of pic_height_in_luma_samples shall be equal to that of pic_height_max_in_luma_samples.

As described in the present embodiment, by adding constraints on the SPS and the PPS, Improvement methods 6 to 8 described above are applicable. Therefore, Problems 1 and 3 described above may be solved.

Encoding and Decoding Method

Hereinafter, an image encoding method and a decoding method performed by an image encoding apparatus and an image decoding apparatus according to an embodiment will be described.

Figure 17:
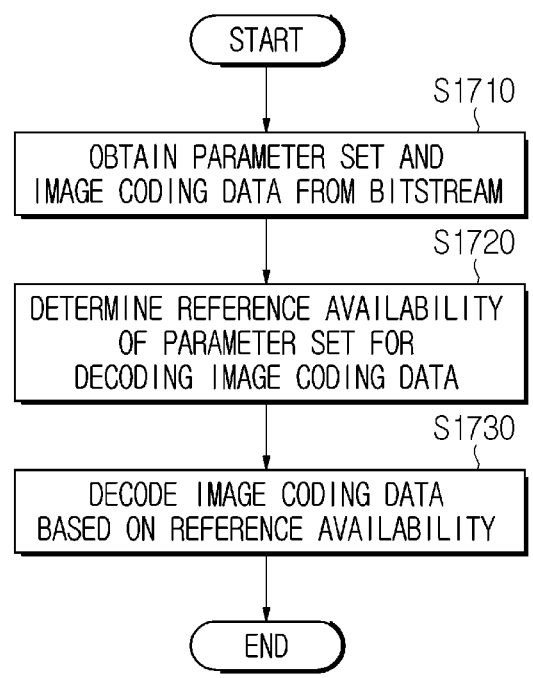
FIGS. 17 to 18 are views illustrating a decoding method according to an embodiment.

FIG. 17 is a flowchart illustrating a method of determining reference availability of a parameter set in order to decode an image by an image decoding apparatus according to an embodiment. The image decoding apparatus according to an embodiment may include a memory and a processor, and the decoding apparatus may perform decoding according to the below-described embodiment by operation of the processor.

First, the decoding apparatus may obtain a parameter set and image coding data from a bitstream (S1710). Next, the decoding apparatus may determine reference availability of the parameter set for decoding the image coding data (S1720). Next, the decoding apparatus may decode the image coding data based on reference availability (S1730).

Here, the decoding apparatus may determine reference availability based on whether an output layer set including a layer corresponding to the image coding data among output layer sets includes a predetermined layer. In addition, a layer corresponding to the image coding data may be a layer with a layer identifier equal to the layer identifier of a video coding layer (VCL) network abstraction layer (NAL) corresponding to the image coding data. The output layer set may be determined based on a video parameter set (VPS). For example, the VPS may signal information on the output layer set as a separate syntax element.

The predetermined layer may be a layer corresponding to the parameter set. For example, the predetermined layer is a layer with a layer identifier equal to the layer identifier of a NAL unit corresponding to the parameter set, and the parameter set may be at least one of a sequence parameter set (SPS), a picture parameter set (PPS) or an adaptation parameter set (APS).

The layer identifier may be expressed by the above-described nuh_layer_id. For example, the layer identifier for the image coding data may be nuh_layer_id of the VCL NAL unit corresponding to the image coding data. The layer identifier for the SPS may be nuh_layer_id of the SPS NAL unit. The layer identifier for the PPS may be nuh_layer_id of the PPS NAL unit. The layer identifier for the APS may be nuh_layer_id of the APS NAL unit.

Figure 18:
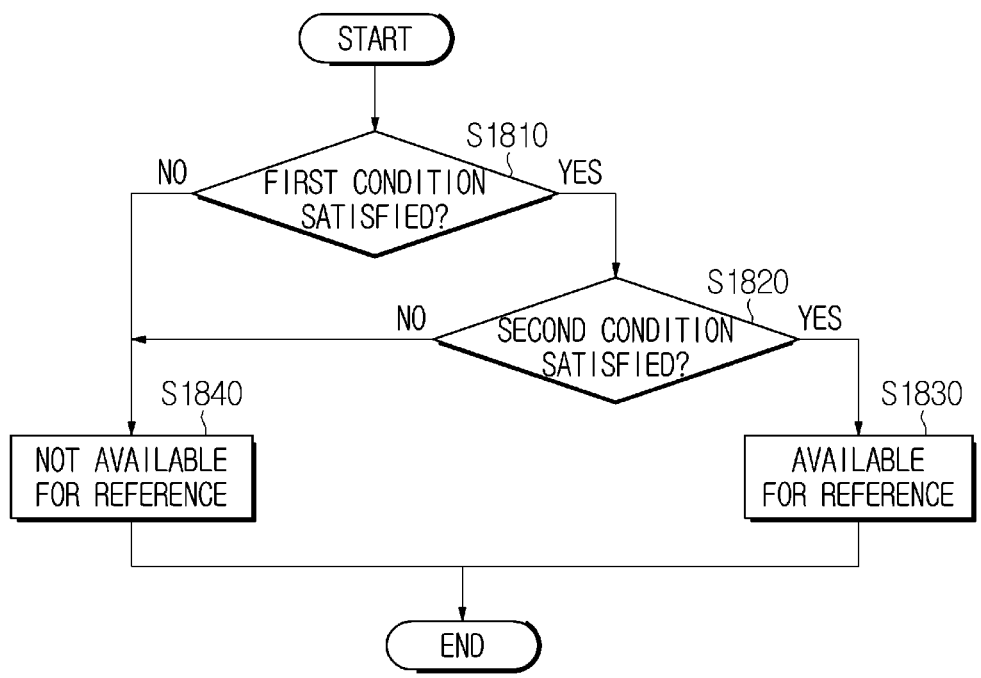

The decoding apparatus may determine reference availability according to the following determination. This will be described with reference to FIG. 18. The decoding apparatus may determine whether to refer to the parameter set based on whether a first condition is satisfied (S1810). Here, the first condition may be whether the value of the layer identifier corresponding to the parameter set is not greater than that of the layer identifier corresponding to the image coding data. The decoding apparatus may determine that the parameter set is not available for reference in order to decode the image coding data (S1840), when the value of the layer identifier corresponding to the parameter set is greater than that of the layer identifier corresponding to the image coding data.

Meanwhile, when the value of the layer identifier corresponding to the parameter set is not greater than that of the layer identifier corresponding to the image coding data, the decoding apparatus may determine whether a second condition is satisfied (S1820). Here, the second condition may be whether all output layer sets including a layer with a layer identifier equal to a layer identifier corresponding to the image coding data include a layer with a layer identifier equal to a layer identifier corresponding to the parameter set.

For example, when all output layer sets including the layer with the layer identifier equal to the layer identifier corresponding to the image coding data include the layer with the layer identifier equal to the layer identifier corresponding to the parameter set, the decoding apparatus may determine whether parameter set is available for reference in order to decode the image coding data (S1830). If not, the decoding apparatus may determine that the parameter set is not available for reference in order to decode the image coding data (S1840).

For example, based on the value of the layer identifier corresponding to the parameter set being greater than that of the layer identifier corresponding to the image coding data, it may be determined that the parameter set is not available for reference in order to decode the image coding data. Based on that at least one of all output layer sets including the layer with the layer identifier equal to the layer identifier corresponding to the image coding data does not include the layer with the layer identifier equal to the layer identifier corresponding to the parameter set, it may be determined that the parameter set is not available for reference in order to decode the image coding data.

In addition, based on that the value of a second layer identifier corresponding to the parameter set is not greater than the value of a first layer identifier corresponding to the image coding data and all output layer sets including the layer with the layer identifier equal to the first layer identifier corresponding to the image coding data include the layer with the layer identifier equal to the second layer identifier, it may be determined that the parameter set is available for reference in order to decode the image coding data.

In an embodiment, the parameter set may include a sequence parameter set (SPS), a picture parameter set (PPS)

and an adaptation parameter set (APS), and reference availability of the parameter set may be individually determined for the SPS, the PPS and the APS.

For example, based on that the value of a second layer identifier corresponding to the SPS is not greater than that of the first layer identifier corresponding to the image coding data and all output layer sets including the layer with the layer identifier equal to the first layer identifier include the layer with the layer identifier equal to the second layer identifier, it may be determined that the SPS is available for reference in order to decode the image coding data.

Additionally (or selectively), based on that the value of a third layer identifier corresponding to the PPS is not greater than that of the first layer identifier corresponding to the image coding data and all output layer sets including the layer with the layer identifier equal to the first layer identifier include the layer with the layer identifier equal to the third layer identifier, it may be determined that the PPS is available for reference in order to decode the image coding data.

Additionally (or selectively), based on that the value of a fourth layer identifier corresponding to the APS is not greater than that of the first layer identifier corresponding to the image coding data and all output layer sets including the layer with the layer identifier equal to the first layer identifier include the layer with the layer identifier equal to the fourth layer identifier, it may be determined that the APS is available for reference in order to decode the image coding data.

For example, in an embodiment, an image decoding method may comprise steps of obtaining a sequence parameter set (SPS) network abstraction layer (NAL) unit from a bitstream, obtaining a video parameter set (VPS) network abstraction layer (NAL) unit from the bitstream, obtaining a picture parameter set (PPS) network abstraction layer (NAL) unit from the bitstream, obtaining an adaptation parameter set (APS) network abstraction layer (NAL) unit from the bitstream, obtaining a video coding layer (VCL) network abstraction layer (NAL) unit from the bitstream, and determining whether the VCL NAL unit does not refers at least one of the SPS NAL unit, the PPS NAL unit and the APS NAL unit based on the VPS NAL unit. Here, the determining whether the VCL NAL unit does not refers may be performed based on a layer identifier of the VCL NAL unit and whether all output layer sets including a layer corresponding to the layer identifier of the VCL NAL unit among output layer sets identified by the VPS NAL unit also include a predetermined layer.

For example, whether the VCL NAL unit does not refer the SPS NAL unit may be determined based on a value of a layer identifier of the SPS NAL unit is less than or equal to a value of the layer identifier of the VCL NAL unit, and whether the all output layer sets including the layer corresponding to the layer identifier of the VCL NAL unit among the output layer sets identified by the VPS NAL unit also include a layer corresponding to the layer identifier of the SPS NAL unit.

Furthermore, whether the VCL NAL unit does not refer the PPS NAL unit may be determined based on a value of a layer identifier of the PPS NAL unit is less than or equal to a value of the layer identifier of the VCL NAL unit, and whether the all output layer sets including the layer corresponding to the layer identifier of the VCL NAL unit among the output layer sets identified by the VPS NAL unit also include a layer corresponding to the layer identifier of the PPS NAL unit. Furthermore, whether the VCL NAL unit does not refer the APS NAL unit may be determined based on a value of a layer identifier of the APS NAL unit is less than or equal to a value of the layer identifier of the VCL NAL unit, and whether the all output layer sets including the layer corresponding to the layer identifier of the VCL NAL unit among the output layer sets identified by the VPS NAL unit also include a layer corresponding to the layer identifier of the APS NAL unit.

Figure 19:
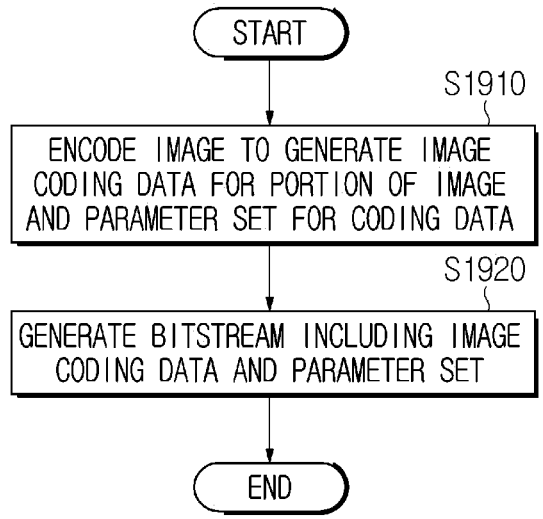
FIG. 19 is a view illustrating an encoding method according to an embodiment.

FIG. 19 is a flowchart illustrating a method of determining reference availability of a parameter set in order to encode an image by an image encoding apparatus according to an embodiment. The image encoding apparatus according to an embodiment includes a memory and a processor, and the encoding apparatus may perform encoding according to a method corresponding to the below-described decoding method by operation of the processor.

For example, the encoding apparatus may encode an image to generate image coding data for a portion of the image and a parameter set for the encoding data (S1910). In addition, the encoding apparatus may generate a bitstream including the image coding data and the parameter set (S1920). Here, the parameter set may be generated based on reference availability of the parameter set for decoding the image coding data. In addition, reference availability may be determined based on whether an output layer set including a layer corresponding to the image coding data among output layer sets includes a predetermined layer.

More specifically, in correspondence with the above-described decoding method, a video parameter set (VPS) includes information on the output layer set, the predetermined layer is a layer corresponding to the parameter set, the layer corresponding to the image coding data is a layer with a layer identifier equal to the layer identifier of a video coding layer (VCL) network abstraction layer (NAL) unit corresponding to the image coding data, the predetermined layer is a layer with a layer identifier equal to the layer identifier of a NAL unit corresponding to the parameter set, and the parameter set may be at least one of a sequence parameter set (SPS), a picture parameter set (PPS) or an adaptation parameter set (APS).

For example, in an embodiment, an image encoding method may comprise steps of generating, by encoding an image, a video coding layer (VCL) network abstraction layer (NAL) unit, a sequence parameter set (SPS) network abstraction layer (NAL) unit, a video parameter set (VPS) network abstraction layer (NAL) unit, a picture parameter set (PPS) network abstraction layer (NAL) unit, and an adaptation parameter set (APS) network abstraction layer (NAL) unit; and generating a bitstream including the VCL NAL unit, the SPS NAL unit, the VPS NAL unit, the PPS NAL unit, and the APS NAL unit, Here, the VPS NAL unit and a layer identifier of the VCL NAL unit may be generated based on whether the VCL NAL unit refers at least one of the SPS NAL unit, the PPS NAL unit and the APS NAL unit.

Furthermore, the VPS NAL unit may be generated so as to all output layer sets including a layer corresponding to the layer identifier of the VCL NAL unit among output layer sets identified by the VPS NAL unit also include a predetermined layer based on whether the VCL NAL unit refers at least one of the SPS NAL unit, the PPS NAL unit and the APS NAL unit.

For example, the predetermined layer may be a layer with a layer identifier equal to a layer identifier corresponding to at least one of the SPS, PPS and APS.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining a parameter set and image coding data from a bitstream;
determining reference availability of the parameter set for decoding the image coding data; and
decoding the image coding data based on the reference availability,
wherein the reference availability is determined based on whether all output layer sets which are specified by a video sequence parameter set (VPS) include a layer corresponding to the image coding data among output layer sets and further include a layer corresponding to the parameter set, or based on information obtained from the bitstream, wherein the layer corresponding to the image coding data is a layer with a layer identifier equal to a layer identifier of a video coding layer (VCL) network abstraction layer (NAL) unit corresponding to the image coding data,
wherein the layer corresponding to the parameter set is a layer with a layer identifier equal to a layer identifier of a NAL unit corresponding to the parameter set, and wherein, based on the information specifying that the parameter set does not refer to the VPS, a layer identifier of a first layer is inferred to be a same as the layer identifier of the VCL NAL unit.

2. The image decoding method of claim 1, wherein, based on a value of a layer identifier corresponding to the parameter set being greater than that of a layer identifier corresponding to the image coding data, it is determined that the parameter set is not available for reference in order to decode the image coding data.

3. The image decoding method of claim 1, wherein, based on that at least one of all output layer sets including a layer with a layer identifier equal to a layer identifier corresponding to the image coding data does not include a layer with a layer identifier equal to a layer identifier corresponding to the parameter set, it is determined that the parameter set is not available for reference in order to decode the image coding data.

4. The image decoding method of claim 1, wherein, based on that a value of a second layer identifier corresponding to the parameter set is not greater than that of a first layer identifier corresponding to the image coding data and all output layer sets including a layer with a layer identifier equal to the first layer identifier include a layer with a layer identifier equal to the second layer identifier, it is determined that the parameter set is available for reference in order to decode the image coding data.

5. The image decoding method of claim 4, wherein, based on that a value of a second layer identifier corresponding to the SPS is not greater than that of a first layer identifier corresponding to the image coding data and all output layer sets including a layer with a layer identifier equal to the first layer identifier include a layer with a layer identifier equal to the second layer identifier, it is determined that the SPS is available for reference in order to decode the image coding data.

6. An image encoding method performed by an image encoding apparatus, the image encoding method comprising:
encoding an image to generate image coding data for a portion of the image and a parameter set for the coding data; and
generating a bitstream including the image coding data and the parameter set,
wherein the parameter set is generated based on reference availability of the parameter set for decoding the image coding data,
wherein the reference availability is determined based on whether all output layer sets which are included in a video sequence parameter set (VPS) include a layer corresponding to the image coding data among output layer sets and further include a layer corresponding to the parameter set, or based on whether the parameter set refers to the VPS,
wherein the layer corresponding to the image coding data is a layer with a layer identifier equal to a layer identifier of a video coding layer (VCL) network abstraction layer (NAL) unit corresponding to the image coding data,
wherein the layer corresponding to the parameter set is a layer with a layer identifier equal to a layer identifier of a NAL unit corresponding to the parameter set, and
wherein, based on the parameter set not referring to the VPS, a layer identifier of a first layer is inferred to be a same as the layer identifier of the VCL NAL unit.

7. A non-transitory computer-readable recording medium storing a bitstream generated by the image encoding method of claim 6.

8. A method for transmitting a bitstream comprising:
transmitting the bitstream generated by an image encoding method;
wherein the image encoding method comprises,
encoding an image to generate image coding data for a portion of the image and a parameter set for the coding data; and
generating the bitstream including the image coding data and the parameter set,
wherein the parameter set is generated based on reference availability of the parameter set for decoding the image coding data,
wherein the reference availability is determined based on whether all output layer sets which are included in a video sequence parameter set (VPS) include a layer corresponding to the image coding data among output layer sets and further include a layer corresponding to the parameter set, or based on whether the parameter set refers to the VPS,
wherein the layer corresponding to the image coding data is a layer with a layer identifier equal to a layer identifier of a video coding layer (VCL) network abstraction layer (NAL) unit corresponding to the image coding data,
wherein the layer corresponding to the parameter set is a layer with a layer identifier equal to a layer identifier of a NAL unit corresponding to the parameter set, and
wherein, based on the parameter set not referring to the VPS, a layer identifier of a first layer is inferred to be a same as the layer identifier of the VCL NAL unit.

* * * * *